June 30, 1942. C. U. BALLARD 2,287,960
HYDRAULIC STEERING AND CONTROL APPLIANCE
Filed Oct. 9, 1939 5 Sheets-Sheet 1
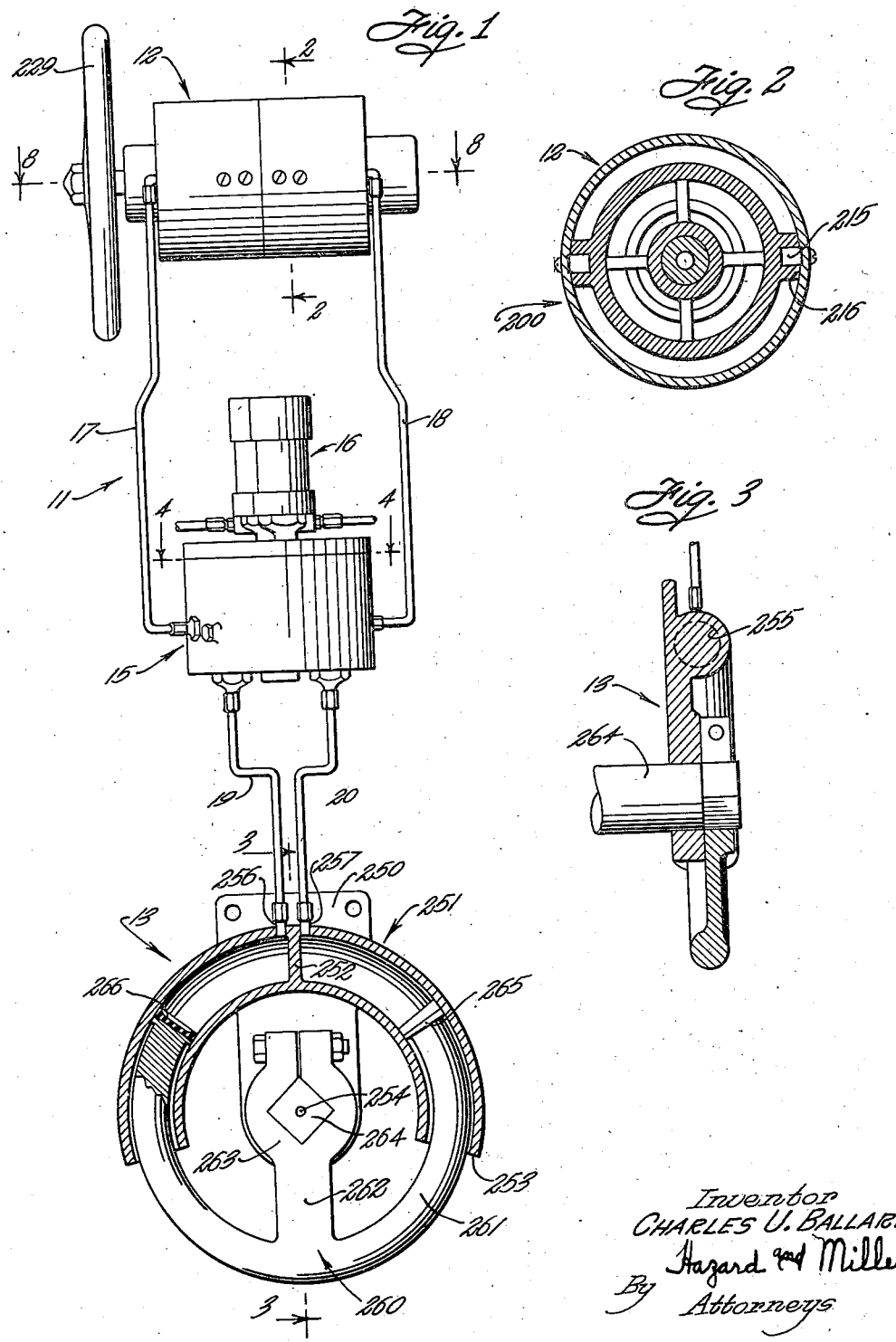
Inventor
CHARLES U. BALLARD
By Hazard and Miller
Attorneys June 30, 1942.  C. U. BALLARD  2,287,960
HYDRAULIC STEERING AND CONTROL APPLIANCE
Filed Oct. 9, 1939  5 Sheets-Sheet 2
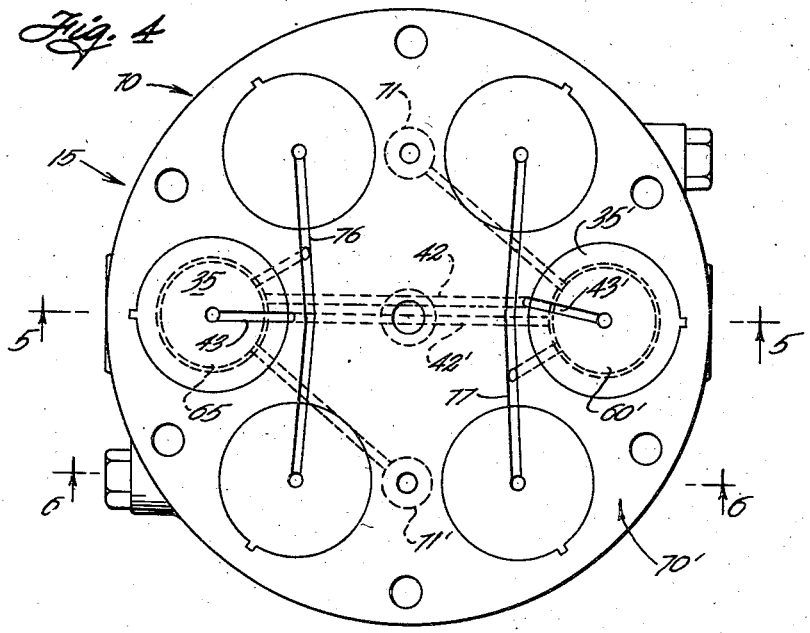
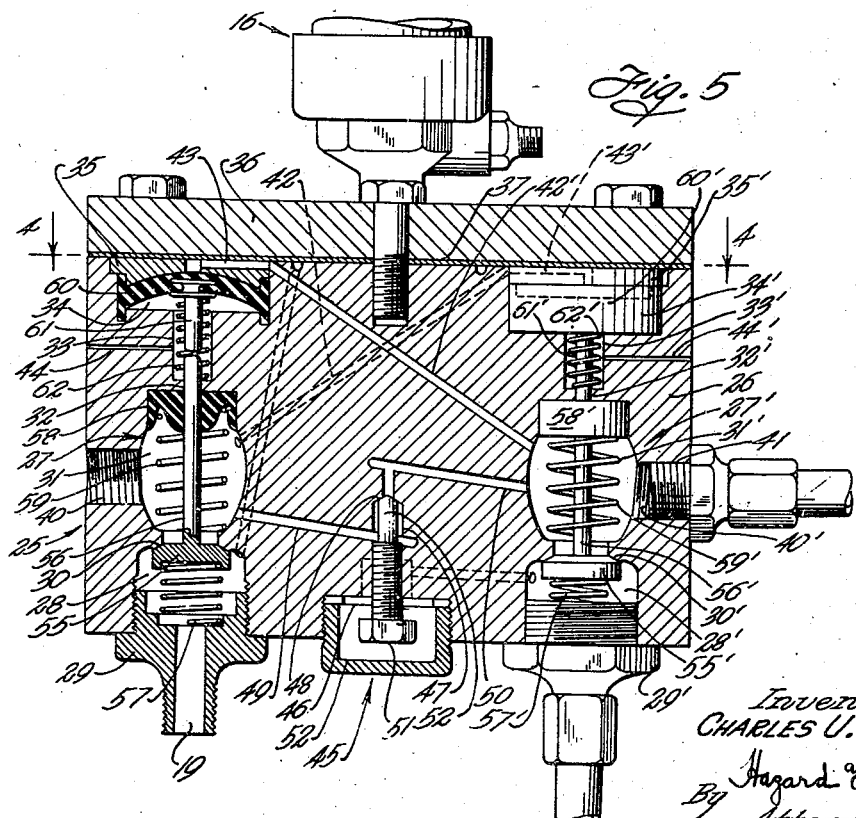

June 30, 1942.  C. U. BALLARD  2,287,960
HYDRAULIC STEERING AND CONTROL APPLIANCE
Filed Oct. 9, 1939  5 Sheets-Sheet 3
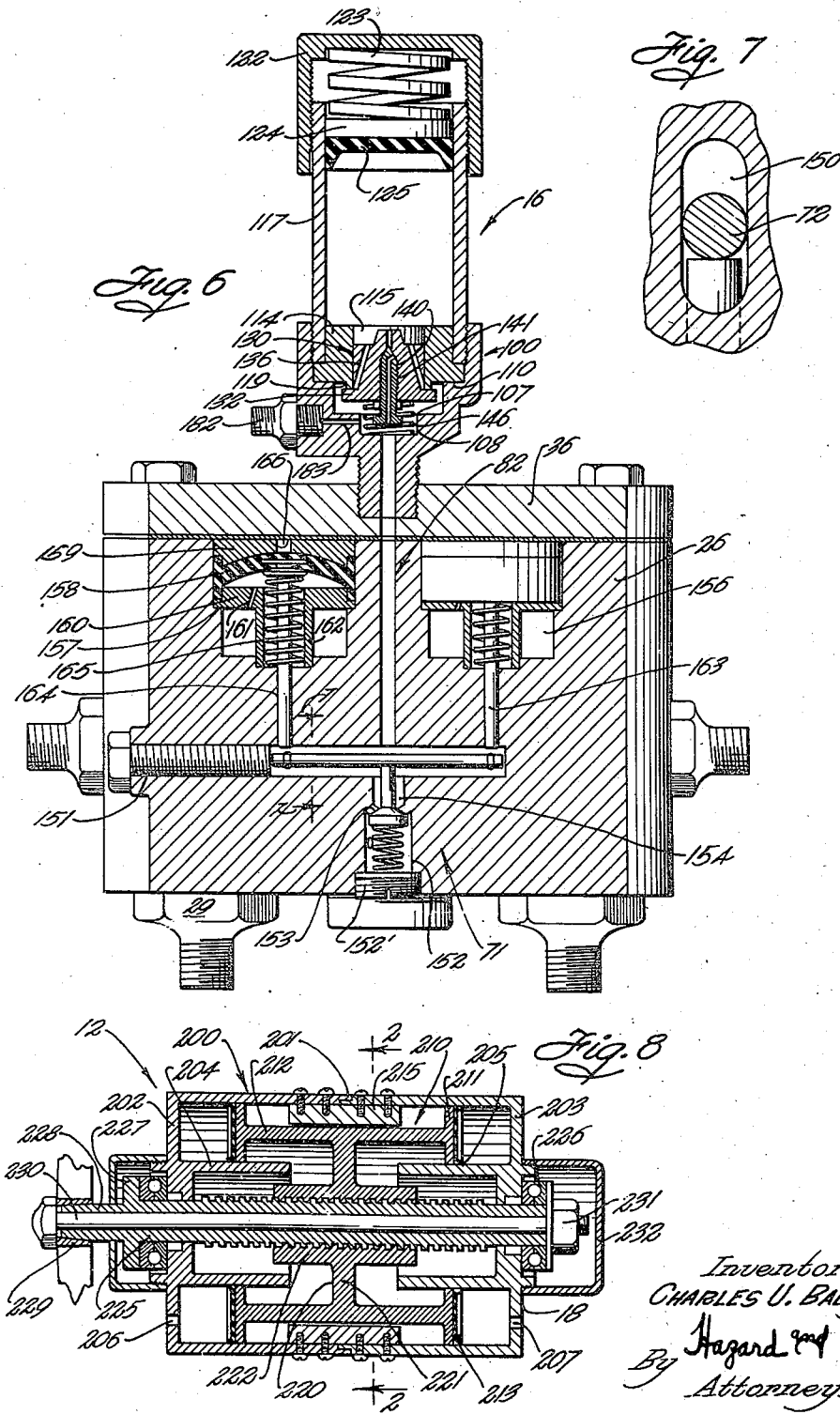
Inventor
CHARLES U. BALLARD
By Hazard and Miller
Attorneys

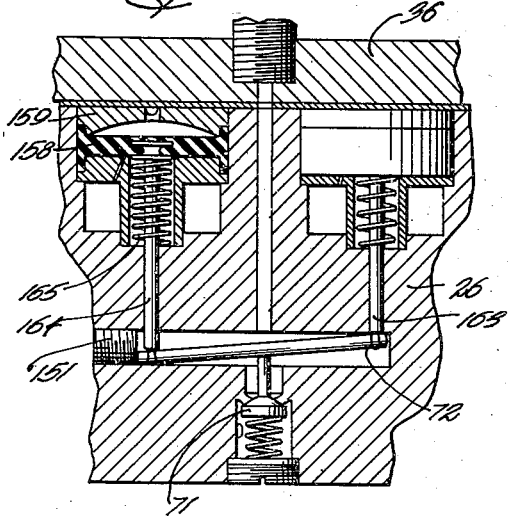
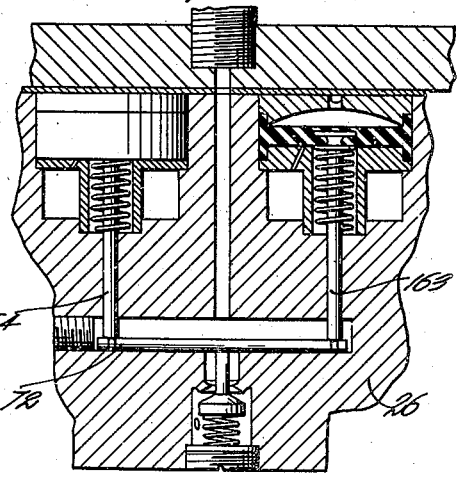
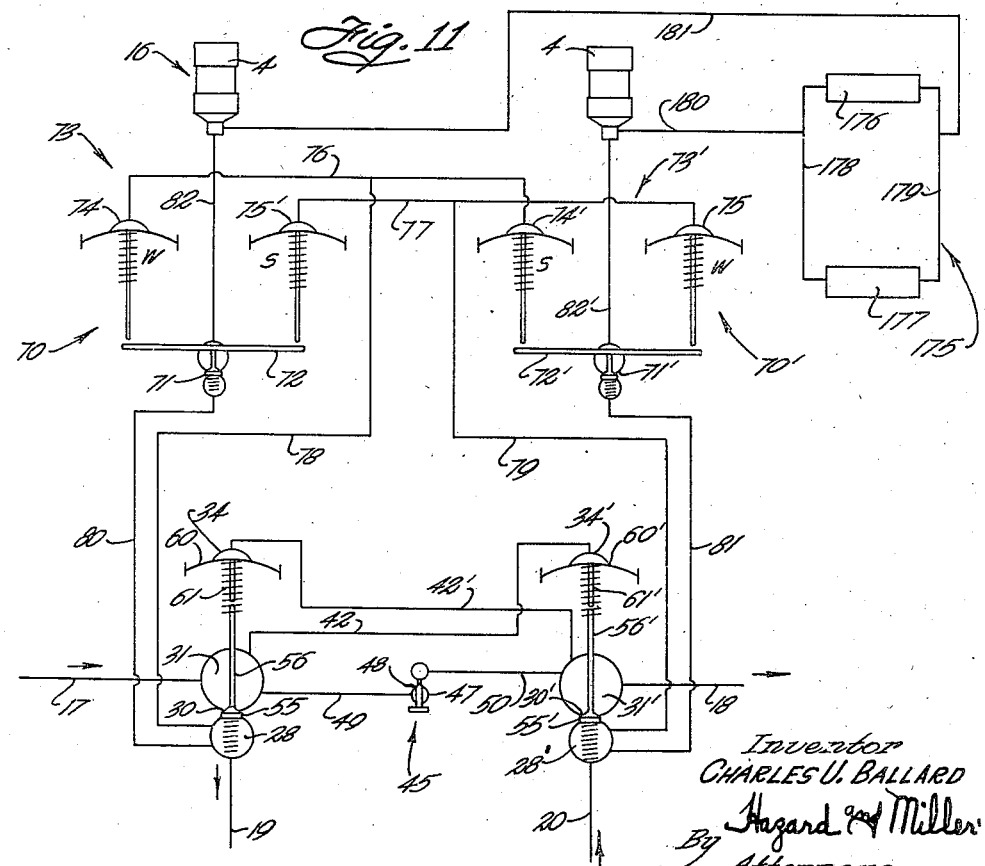
Inventor
CHARLES U. BALLARD
By Hazard and Miller
Attorneys

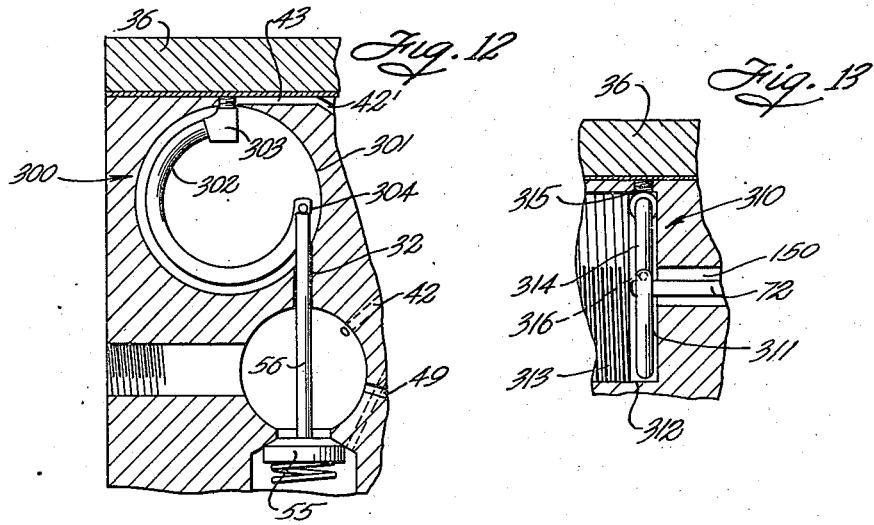
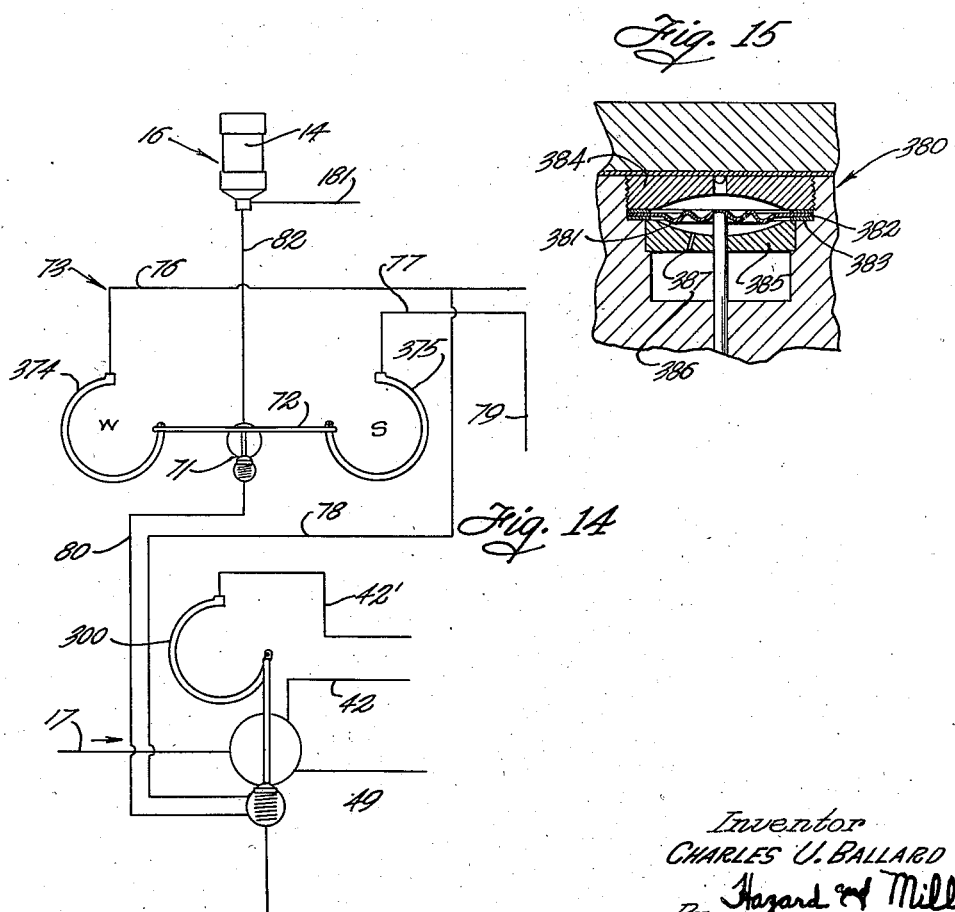

Patented June 30, 1942

2,287,960

UNITED STATES PATENT OFFICE 2,287,960

HYDRAULIC STEERING AND CONTROL APPLIANCE

Charles U. Ballard, Inglewood, Calif.

Application October 9, 1939, Serial No. 298,686

20 Claims. (Cl. 60—54.5)

My present invention may be considered as an improvement or a further development of my patent application for Hydraulic Steering and Control Device, Ser. No. 40,912, filed September 17, 1935, matured into Patent No. 2,192,175, issued March 5, 1940.

While I have given a title to my invention as pertaining to hydraulic steering and control appliance, nevertheless as to many features it is applicable to the so-called hydraulic pulsator systems of control of various mechanisms and operations of machines or equipment. In such type of pulsator systems a hydraulic compressor is connected by generally dual piping connections to a motor or actuator unit. The compressor for instance may be manipulated or manually controlled and thus by transfer of the hydraulic fluid operates the motor, that is, the actuator unit. Such latter unit then operates in this case as illustrated, a steering rudder for a vessel or other pieces of mechanism or machines.

One of the problems which arises and requires solving in the hydraulic pulsator systems is to take care of the expansion of the hydraulic fluid in the hydraulic system due to rise of temperature or other causes and also to supply hydraulic fluid to compensate for contraction of the fluid in the system due to lowering of temperature and in addition to supply sometimes relatively large amounts of the fluid from a reservoir to replace that lost by leakage. In my patent application and patent above identified I in a measure solve these problems for the mechanism illustrated in such application and patent by a combination pressure relief valve device and a supply reservoir having a supply valve for replenishing the fluid in the hydraulic system of the pulsator. In my present invention I use substantially the same design as to the details of this combination pressure relief valve and supply reservoir.

In the pulsator systems when in operation there is developed what may be termed a high pressure side and a low pressure side, the high pressure side being produced by the operation of the compressor and the positive transference of the hydraulic fluid which does the work in the motor unit to cause its operation for actuating some device. The low pressure side provides for the transfer of the hydraulic fluid from the motor or actuator unit back to the compressor, this however doing no positive work. As a refinement or further development of the operation of the pressure relief valve to handle expansion and/or contraction of the fluid in the system and the reservoir supply is one of the features of my present invention.

Thus an important feature of my present invention includes a plunger controlled check valve assembly so arranged to open by a pressure developed on the low side of the pulsator system so that such check valve is positively open and forms a connection only to the low pressure side of the dual compressor and motor hydraulic circuits. This opens the field of employing high pressure pulsator systems and also low pressure pulsator systems each connected to the same reservoir and expansion valve assemblies. This is made possible due to the fact that the reservoirs and expansion valve operating in conjunction with the high pressure pulsator systems are only operable on low pressures and thus may be connected in addition to a low pressure pulsator mechanism.

Considered in more detail the low pressure check valve assemblies each include two diaphragm or piston operated plungers, thus forming a pair for each valve assembly of the dual line pulsator systems. Each pair of plungers operates a teeter pin pivoted on the plunger of a spring pressed check valve. To obtain a differential operation of each pair of plungers, one plunger is actuated for a return by a relatively weak and the other plunger by a relatively strong spring. The diaphragms of each pair are cross connected to the high and low pressure sides of the pulsator thus connecting a diaphragm with a relatively strong spring of one valve unit and the diaphragm with the relatively weak spring of the other valve unit, the connections for the dual plungers being thus the same to the low and the high sides of the pulsator systems no matter in which direction the pressure may be operated at any particular instance. In this connection the high pressure is always sufficient to operate two plungers by a movement of the diaphragms of the relatively strong and relatively weak springs of the two units, however the low pressure side has only sufficient pressure to operate the weak spring diaphragm of one unit leaving the strong spring diaphragm of the other unit inactive, therefore only one teeter pin and its associated check valve is operated and this check valve by the hydraulic connections will always be on the low pressure side of the pulsator system.

A further object and feature of my invention resides in a positive lock valve assembly incorporated in the two hydraulic connections between the compressor and the motor or actuated. This employs two similar valves, each developing a positive through flow for the high and low pressure sides of the system however in order for the low pressure valve to open it is necessary to operate such valve by a diaphragm or piston actuated plunger through the medium of a hydraulic connection to the high pressure side of the pulsator.

Therefore to operate the motor or actuator by a transfer of hydraulic fluid by the compressor the flow in the high pressure side from the compressor to the motor or actuator opens the diaphragm actuated valve in the return circuit from the motor to the low pressure side of the compressor, however, as soon as the compressor is stopped at any particular position, thus stopping the motor, that is, the actuator in a definite position, both valves are automatically spring-closed and thus giving a positive lock to the fluid in the actuator and the flow connection thereto and the compressor and the flow connections therefrom to the two similar valves. This is an important characteristic for instance in steering a vessel as the rudder when once moved to a position is positively held at such turn until the compressor is again shifted to another position, hence wave or current action together with the wind pressure of a vessel cannot shift the rudder when the valves are positively locked by the compressor being maintained stationary.

Another feature of my invention resides in connecting the piping and valve system of the two sides of the pulsator system with the low pressure teeter pin operated valves so that the connections to the two reservoirs and the expansion valve is only through the side of the hydraulic circuit which at any particular time happens to be the low pressure side. Therefore by having the two reservoirs and their expansion valves operative only on the low pressure side of the pulsator system, I may use the same reservoirs and expansion valves for a low pressure pulsator assembly.

In some applications of my invention it is either not practical or inadvisable to actuate the valves including the teeter pin controlled check valves by moving pistons or diaphragms which might be subject to leakage or require that there be an air chamber. In such cases I may utilize closed diaphragm type of expanders and contractors, the expansion being on increase of pressure and the contraction being when the pressure is decreased. My invention comprehends a simple type of liquid pressure control and actuator for the valves by utilizing an expansible curved tube. Such tube at one end is fixed forming an entrance for the liquid and the tube is free to change its curvature on changes of internal pressure, then in such a construction as the pressure is increased the tube expands, that is, tends to straighten, increase the radius of curvature or if a coil tube is employed, to uncoil. This develops a movement of the free end of the tube which end may be utilized to actuate the valves such as the teeter pins of the teeter pin valves or to actuate the main control plug valves. Where the curved tubes are used, it is necessary to have a suitable backing or thrust surface to prevent a tube which is subjected to high pressure flattening to too great an extent. By this construction therefore the tube subjected to low pressure can readily expand and contract and the tube subjected to the high pressure expands to contact the backing surface and then can expand no further.

My invention is illustrated in connection with the accompanying drawings, in which:

Fig. 1 includes elevation and sectional views of a pulsator system including a compressor, a motor or actuator and a combination valve assembly with reservoirs interlinked in the piping system by the piping connections of the assembly. In this figure the compressor is shown in side elevation, the valve assembly also in a side elevation and the motor or actuator in partial section.

Fig. 2 is a section through the compressor on the line 2—2 of Fig. 1 in the direction of the arrows.

Fig. 3 is a section through the motor or actuator on the line 3—3 of Fig. 1 in the direction of the arrows.

Fig. 4 is a horizontal section on the line 4—4 of Fig. 1 or 5 being in effect a plan of the combined valve assembly with the cap plate removed.

Fig. 5 is a vertical section through the valve assembly on the line 5—5 of Fig. 4 in the direction of the arrows illustrating the positive lock valves for the high and low pressure sides of the compressor motor or actuator hydraulic circuits.

Fig. 6 is a vertical section taken substantially on the line 6—6 of Fig. 4 in the direction of the arrows illustrating one of the teeter pin actuated check valve assemblies with a connection to the combined supply reservoir and expansion relief valve. This illustrates the check valve closed and the teeter pin in its neutral or inactive position.

Fig. 7 is a detail section on the line 7—7 of Fig. 6 in the direction of the arrows illustrating the mounting of the teeter pin.

Fig. 8 is a longitudinal section through the compressor on the line 8—8 of Fig. 1 in the direction of the arrows.

Fig. 9 is a partial section similar to Fig. 6 illustrating the teeter pin actuated check valve with the pin partially operated.

Fig. 10 is a section similar to Fig. 9 with the teeter pin in its completely displaced position opening the check valve.

Fig. 11 is a diagram of an assembly with the combination valves linked with a high pressure pulsator system and with the supply reservoir and expansion valve connected to a low pressure pulsator system.

Fig. 12 is a partial section of a modified construction of the plug valve assembly showing the actuation of such valve by an expansible curved tube filled with liquid under pressure.

Fig. 13 is a partial section of an expansible liquid filled tube for operating one end of the teeter pin.

Fig. 14 is a partial diaphragm similar to that of Fig. 11 illustrating the substitution of the expansible tube actuation of the plug and the teeter pin operated check valves.

Fig. 15 is a partial section through a metal type of diaphragm connection for operating the main plug valves of the teeter pin controlled check valves.

Considering first the assembly of Fig. 1, this is designated as a whole as a high pressure pulsator system 11 being provided with a compressor unit 12 and a motor or actuator unit 13. With this assembly I utilize a combination positive lock valve and control valves for admitting fluid or for expansion, the assembly being indicated by the numeral 15. With this assembly I employ two combination supply reservoirs and expansion valve indicated by the numeral 16. This element is substantially the same as illustrated and described in connection with my patent application and patent above identified. Connecting the compressor and the combination valve assembly 15 there are pipe lines 17 and 18 and continuation pipe lines to the motor or actuator being pipes 19 and 20.

The positive lock valves intermediate the sides of the pulsator system which in operation at any time represent high and low sides is indicated as an assembly by the numeral 25, note particularly Figs. 4, 5 and the diagram of Fig. 11. For sake of convenience I employ a valve block 26 which has various chambers, bores and seats, providing two distinct valve assemblies 27 and 27'. These are of similar construction and at the bottom are provided with valve plug recesses 28 and 28' into which are threaded pipe coupling nipples 29 and 29'. The valve seats 30 and 30' face downwardly. Above the valve seats is an enlarged chamber 31 and 31' connected by a guide bore 32 and 32' with an upper recess 33 and 33' leading to the diaphragm chambers 34 and 34'. These latter are closed by plugs 35 and 35' at the top, the whole assembly having a cover cap 36 with a gasket 37 to form a seal, the cap being bolted in place in any suitable manner. The valve block has various ducts and passages including a nipple connection 40 and 40' to which are connected nipples for the pipes 17 and 18 leading from the compressor. The nipples 29 and 29' provide connections respectively for the pipes 19 and 20 leading to the motor or actuator unit 13. There are communicating pressure fluid ducts 42 and 42' communicating between the chambers 31 and 31' and the top of the diaphragm chambers 34 and 34' respectively. In the illustration the caps 35 and 35' are provided with grooves 43 and 43' leading to the top of the diaphragm chambers. There are air bleeder ducts 44 and 44' communicating from the upper recesses 33 and 33' through the valve block to atmosphere.

The block is also provided with a by-pass valve assembly 45 including a large recess 46, a partly threaded valve plug recess 47, a valve seat 48. A duct 49 leads from the chamber 31 to the valve plug recess 47 on one side of the seat and duct 50 communicates from the chamber 31' to the opposite side of the valve seat. A threaded valve stem 51 has a valve plug 52 which may be seated against the valve seat 48, however when this is open there is a full communication between the chambers 31 and 31', thus affording a direct bypass fluid connection between the opposite sides of the compressor unit, that is, between the pipes 17 and 18. A protective cap 52 is threaded into the recess 46 being sealed by a gasket and thus makes an air tight cover and protector for the by-pass valve structure.

The moving valve elements include valve plugs 55 and 55' each having a valved stem 56 and 56', the stems extending upwardly through the chambers 31 and 31' through the guides 32 and 32' into the recesses 33 and 33'. The plugs are urged upwardly by springs 57 and 57' shown as seating on the nipples 29 and 29' respectively and on the under side of the plugs 55 and 55'. Packing gaskets 58 and 58' are located in the upper part of the chambers 31 and 31' having a thrust against a squared shoulder and retained in position by thrust springs 59 and 59', which seat at their upper end in the gasket and at their lower ends on the lower part of the enlarged chamber 31 and 31'. Located in the diaphragm chambers there are two diaphragms 60 and 60', these being of flexible material with flanges located in grooves therefor, the flanges being confined on the upper side by the plugs 35 and 35' respectively. Thrust stems 61 and 61' are connected to the diaphragms and extend downwardly into the recesses 33 and 33', these being of such length that when the diaphragm valve is closed and the plug valves 55 and 55' are also closed, there is but a slight clearance between the two stems of each valve assembly. The diaphragms are thrust upwardly by springs 62 and 62' respectively.

The operation of the positive lock assembly identified by the assembly numeral 27 and 27' is substantially as follows having reference particularly to Fig. 11. Presuming that the compressor unit 12 is operated in such a manner as to produce a hydraulic pressure in the pipe 17 necessitating the flow of fluid from the pipe 17 to the pipe 18 by way of pipes 19 and 20 indicated by the direction arrows in Fig. 11, the high pressure through the pipe 17 develops a high pressure in the chamber 31. This is effective on the upper area of the valve plug 55, to depress this plug against the resistance of its spring 57. Thus there is opened a passage at the valve seat 30. High pressure fluid then flows from the chamber 31 to the chamber 28 and thence by the pipe connection 19 in the direction of the arrow of Fig. 11 to the motor or actuator unit 13. However before the actuator unit may be moved there must be a relief for the fluid in the motor on the low pressure side, hence the pressure in the chamber 31 connected with the high pressure pipe 17 is transmitted through the duct 42 to the top of the diaphragm chamber 34'. The diaphragm 60' is hence depressed, thus in the downward thrust and movement of the diaphragm operated stem 61' depresses the stem 56' of the valve plug 55' and opens the valve seat 30'. This affords a communication between the recesses 28' and the chamber 31' forming a release on the low pressure side of the motor or actuator unit 13. There is thus developed a positive flow of low pressure liquid through the recesses 28' past the valve seat 30' into the chamber 31' and hence by the pipe 18 back to the low pressure side of the compressor unit 12. It will thus be seen that the high pressure side of the compressor opens it own connection to the high pressure side of the motor or actuator unit. The high pressure also operates a diaphragm valve which causes a positive opening of the opposite positive locked valve thereby permitting the return of liquid from the low pressure side of the motor or actuator to the low pressure side of the compressor unit. There is only a slight flow of liquid at any time in the ducts 42 and 42' to the respective diaphragm chambers however to allow air trapped underneath the diaphragms to have a free passage to atmosphere I provide the bleeder ducts 44 and 44'. However if the diaphragm chambers are made large enough, the air may be compressed without necessitating the use of an air bleeder duct.

Presuming it is desired to set the compressor with the actuator in a known position such as in what might be termed a neutral location, I use the by-pass valve assembly 45. For instance if the actuator is connected to the rudder of a vessel, the compressor may be operated to align the rudder in a direct fore and aft position as to the vessel and when the actuator is so positioned it may happen that the compressor is not in its neutral position, therefore the valve 45 is opened and this gives a direct passage for instance between the pipes 17 and 18 on the opposite sides of the compressor unit through the chambers 31 and 31', the ducts 49 and 50, and the open valve at the seat 45, thus any movement of the compressor unit merely transfers fluid from one side of such unit to the other without moving the actuator unit and hence the compressor may be re-set if out of location at its neutral position, thus at a definitely known location when for instance the rudder of a vessel is in a fore and aft position, the by-pass valve 45 is then closed.

The features of the low pressure connections to the reserve or supply reservoir and to the expansion relief valves is substantially as follows, having reference particularly to Figs. 1, 4, 6, 7, 9, 10 and 11. For the sake of convenience and within the valve block 26, I locate two so-called teeter pin valve assemblies 70 and 70'. Each of these employs a spring actuated check valve indicated at 71 and 71', note the diagram of Fig. 11. Each of these check valves is actuated by a teeter pin 72 and 72' balanced on the check valves. The teeter pins are actuated respectively by two diaphragm valve assemblies 73 and 73', having four diaphragm actuating plungers, there being four diaphragm chambers designated 74 and 74', 75 and 75' with the respective diaphragms actuating plungers hereunder described in detail. There is a connecting passage or duct 76 between the diaphragm chambers 74 and 74', and a similar duct or connection 77 between the diaphragm chambers 75 and 75'. A duct or passage 78 communicates from the recesses 28 of the positive lock valve assembly to the duct connection 76. A similar duct or pipe connection 79 leads from the recesses 28' to the duct connection 77. There is also a pipe or duct connection 80 from the recess 28 to the underside of the check valve 71 and a similar pipe connection 81 from the recess 28 to the underside of the check valve 71'. Each of these check valves has a duct connection indicated at 82 and 82', note Fig. 11, each to its own assembly of the reservoir supply and expansion valve 16, there being two of these assemblies and such assemblies being constructed and operative substantially in the manner of my patent application and patent above identified.

To save reference to my application and patent above noted, the reservoir and expansion valve illustrated particularly in Fig. 6 has the following characteristics utilizing the same numerals as my application and patent to identify similar elements. This application is a continuation in part of my patent above noted, this case being filed during the pendency of the application resulting in such patent. The valve housing assembly is in the form of a cup structure having certain recesses and includes a lower valve seat with grooves 107 and a central recess 108 therebelow. An annular shoulder 110 is operative to support the ring 114 which has a cylindrical bore 115 and at the bottom a projecting ring 119, the lower edge of which forms an upper valve seat. The housing and the ring form a support for the reservoir cylinder 117. Screw threaded to the upper end of this cylinder is an adjusting pressure cap 122 which forms the upper seat for a compression spring 123 exerting a downward thrust on the disk piston 124, the piston reacting against a piston cup 125. The slidable valve plug designated by the assembly numeral 130 slides in the cylindrical bore 115 and has a lower flange 132 adapted to seat against the rim 119 and also to be forced downwardly to the seat having the grooves 107. This plug is normally pressed upwardly by a spring. Main ducts 136 lead through the sliding valve plug and thus when the plug is thrust downwardly form passages leading below the rim 119. The needle valve designated by the numeral 140 has a tubular threaded stem 141 with a fine port at the top operative against the cone seat of the needle valve, the seat being located in the plug 130. The head 146 is used for adjusting the stem of the needle valve, this adjustment being made prior to the assembly and is adjusted with a sufficient opening to permit a small passage of liquid drop by drop to accommodate expansion and contraction of the liquid in the compressor motor system. The liquid confined in the reservoir is fed to the system through the action of the compressed spring 123 and on a pressure in the system being less than that for which this spring reacts, the plug valve 130 becomes opened, thus leading a supply of the liquid to the pulsator system.

Referring to the mechanical construction of the teeter valve assembly, particularly as shown in Figs. 6, 7, 9 and 10, the assemblies are substantially identical and may be located in the block 26 which houses the positive lock valves 27. This block is provided with cored slots 150, note Fig. 7, to accommodate the teeter pins and as only one assembly is shown in this figure, this is indicated as the teeter pin 72. The end of the slot is threaded and a plug 151 threaded therein which restricts the endwise movement of the teeter pin. The check valve assembly for instance such as 71 has a recess 152 with a closure plug 152' threaded therein. The check valve seat 153 leads to a bore 154 which connects to the cored slot 150. The duct 82 or 82' is formed by a bore 155 leading upwardly through the block 26 preferably in alignment with the bore 154 through an opening in the cap 36 and connects with the combination reservoir and expansion valve assembly 16. Each of the diaphragm chambers 74, 74', 75 and 75' are made in the same manner illustrated as having quite large recesses 156 with a shoulder 157. The diaphragms 158 are retained in position by having an upper plug 159 fit in the upper portion of the diaphragm recesses and confining the upper flanges. The lower flange is confined by a disk 160 having a duct 161 therethrough. A tube 162 preferably formed integral with the disk leads downwardly having a seat in the bottom of the recesses 156. Each of the diaphragms has a diaphragm actuated stem 163 connected in any suitable manner to the diaphragm proper and extending downwardly centered in the tube 162 and passing through a guide bore 164 in the block 26 to the cored slot 150. The diaphragms are normally pressed upwardly by a spring 165 which seats at the bottom of the recesses 156 and exerts an upward thrust on the underside of the flexible diaphragm. Connections 76 and 77 are provided by ducts in the block 26 communicating with grooves 166 in the plugs 159. Therefore referring to the diagram of Fig. 11, the fluid connection 78 to the ducts 76 forms a connection to the upper side of the diaphragms of opposed valve assemblies and likewise the connection 79 to 77 has a similar connection to opposed diaphragm chambers. An important detail of the diaphragm valves is in the springs 165 which react to different pressures. For instance the springs of the diaphragm valves 75' and 74' are indicated as relatively strong springs indicated by the letter S whereas the springs reacting against the diaphragm valves indicated by the chambers 74 and 75 are relatively weak springs indicated by the letter W. I find that a very little difference is sufficient. For instance, I have made the springs marked S of a 3 lb. reaction and the springs marked W with a 2 lb. reaction. One of the objects of having a large space such as the recesses 156 for the diaphragm operated valves is for these to form air or inert gas chambers so that in the operation of the diaphragms the air flows through the ducts 161 in the disks 160 and there is sufficient space for the slight compression of the gas. It is hence not necessary to use bleeder ducts connected to atmosphere.

The operative connection of the teeter pin valves between the pulsator system and the positive lock valve with the reservoir and expansion valve is substantially as follows, having reference particularly to the diagram of Fig. 11 and also noting the position of the valves as in Figs. 6, 9 and 10. In the description of the action of the positive lock valves, the compressor is defined as exerting a pressure and a flow on the liquid in pipe 17 which developing a positive pressure opened the valve 55 permitting a high pressure flow through the recess 28 to the pipe 19. This also develops a pressure connection through ducts 78 and 76 from the recesses 28 to the diaphragm chamber 74 and 74' and also a pressure connection through the duct 80 to the underside of the check valve 71, the tendency of which is to retain such check valve closed. The teeter pin valves are so constructed that in the normal or inactive position the teeter pin may be considered as balanced on the stem of the check valve as shown in Fig. 6. Of course it may be tilted down at one end but this is immaterial as the heighth of the slot 150 is such as to permit the pin, either 72 or 72', to tilt on the stem of the check valve without operating such valve. Therefore, as there is a high pressure connection on the diaphragm valve 74 and 74', these are both actuated, that is, depressed, thus acting against both the relatively weak and the relatively strong springs of two valve assemblies.

Should the liquid in the system between valves 55 and 55' and the motor, namely the liquid in the lines 19 and 20 become heated and consequently expanded, the expansion of the liquid develops pressure in the ducts 79 and 77 which lead to the diaphragms 75 and 75'. This pressure due to the temperature expansion is also conducted to the under side of valve 71' through duct 81. Ordinarily such pressure developed by temperature expansion is relatively low. This low pressure in the connection 77 is sufficient to depress only the relatively weak spring diaphragm 75, the strong spring pressed diaphragm 75' remaining in its upper position. Such action causes a movement of the respective plungers designated 163, Fig. 6, from the position of Fig. 9 to that of Fig. 10 which action of depression of the teeter pin causes a downward thrust and opening of the check valve plug and hence a through connection is made by means of the ducts designated 82' in Fig. 11 to the reservoir and expansion valve connected to such duct. Such connection is typically illustrated in Fig. 6. It will therefore be seen that should there be a deficiency of liquid in the system which always occurs on the low pressure side of the pulsator system, the valves are opened by which the pressure in the reservoir, which although it may be comparatively low compared with that of the high pressure side, forces the liquid through the opened check valve, the duct 81 and hence to the duct 20 and thus to the low pressure side of the motor or actuator. During the periods of movement of the compressor and actuator as the valve 55' on the pressure side will also be open, there is a connection formed from the recess 28' to 31' and thence to the pipe 18 and the low pressure side of the compressor. As above mentioned, in these set of circumstances the check valve 71 on the high pressure side is maintained closed and thereby prevents flow of the liquid either to or from the reservoir to which such check valve is connected.

Presuming that the compressor is moved to a certain position thus causing the movement of the actuator and then the compressor is held stationary, the motor or actuator then remains in the positon to which it has been shifted and the locked valve assembly becomes closed. Presuming the whole system is quiescent, that is, the compressor is not moved and the motor hence has no movement and the equipment be subject to a rising temperature, manifestly the increase of pressure due to the expansion of the fluid in the pulsator system and in the locked valve assembly develops either sufficiently high pressure in the duct connections 76 and 77 to open both of the check valves 71 and 71' or to open one of these allowing discharge of the liquid due to expansion through the needle valves 140, note Fig. 6. Likewise should there be a cooling and contraction of the liquid in the pulsator system, this will cause a lowering of the pressure and hence there is a relative difference, that is, one side of the system being considered lower than the other as to pressure, one or other of the needle valves 71 or 71' will become opened due to the differential pressures in the ducts or lines 76 or 77.

In view of the fact as above described that the reservoir assemblies 16 with their expansion valves and supply valves are always on a low pressure side of the pulsator system, I may form the supply and expansion connections for a second pulsator system indicated at 175, Fig. 11. This system is indicated as having a compressor 176 and a motor or actuator 177, these being connected by the spiping or other connections 178 and 179. In this case there may be a valve assembly such as the lock-out valves of 27 or 27' installed but such is omitted for sake of clearness. A pipe 180 is indicated as leading from one side of this low pressure pulsator system such as 178 to one of the reservoir assembles and another pipe 181 leads from the side 179 to the other reservoir. The connections to the reservoir are shown in Fig. 6 in which the valve housing 100 is provided with a nipple connection 182 and has a duct 183 communicating with the recess 108. In practical application my main pulsator system may be utilized for steering a boat which requires a relatively high hydraulic pressure, this of course depending on the size of the vessel and related conditions whereas the low pressure pulsator system 175 may be utilized for operating a throttle in which the compressor 176 may be the manually operated lever of a throttle system and the actuator or motor 177 be connected to the throttle valve of a carburetor or the like. As such a system requires comparatively very low pressures, the same reservoirs and expansion valve assemblies may thus be used for high and low pressure pulsator systems.

In the above description I have designated the operation of the hydraulic circuits and valves independent of any particular type of compressor or motor. However, I have made certain improvements in both of these. The construction of the compressor designated by the assembly numeral 12 is substantially as follows, having reference particularly to Figs. 1, 2 and 8. In this construction I have an outer cylinder 200 made in two halves with a joint 201. This cylinder has opposite heads 202 and 203. Formed integral with these heads are two short inner cylinders 204 and 205, these being cylindrical on their outside surfaces, the outer cylinder being cylindrical on its inside surface. The heads are provided with ports 206 and 207, which in the illustrations, port 206 has an angle nipple connected to the pipe 17 and the port 207 is likewise connected to the pipe 18. A double acting piston assembly 210 has similar annular piston heads 211 secured to an annular web 212 which forms in effect a piston rod with double ended pistons. Annular rubber piston cups 213 operate thus in the annular cylinder space between the outer cylinder 200 and the inner cylinders 204 and 205. This produces a construction with a large space as to the volume of the liquid compared with the length of the actuator. Splines 215 bolted to the inside of the cylinder 200 and straddling the joint 201 fit in a groove formed between parallel flanges 216 extending outwardly from the cylindrical web 212 and thus not only guide the pistons in a straight line longitudinal motion but prevent their rotation, the main function being to restrain the piston from rotation. The piston assemblies have a central hub structure 220 formed by a transverse web 221 formed integral with the cylindrical webs 220 and having the internally threaded nut 222, thus being illustrated as provided with squared threads.

To actuate the nut and hence the pistons in a to and fro motion in the cylinders, a tubular screw shaft 225 extends through openings in the heads 202 and 203 and is mounted in anti-friction bearings 226, one of these bearings being confined by a disk-like flange 227 at one end of the shaft 225. Such shaft has an extension 228 engaged by a compressor operated wheel 229, this having any suitable driving connection therewith. A clamping and tightening bolt 230 extends through the hub of the compressor actuated wheel and through the tubular screw shaft 225 having an attaching nut 231 at its remote end. Cover caps 232 engage the anti-friction bearings and at one end the nut 231. Hence by the construction illustrated on rotation of the compressor operated wheel 229, the interaction of the screw shaft 225 and the nut 222 of the piston assembly causes a movement of the pistons as a unit either in one direction or another. For instance in the description of the operation, the piston assemblies are considered as being moved to the left, note Fig. 8 and thus compressing the fluid, forcing this out through the port 206 and requiring replenishment through the opposite head at the port 207, these ports as above mentioned being respectively connected to the pipes 17 and 18. It is of course immaterial in what manner the compressor is mounted to hold the cylinder 200 stationary and place the operating wheel in a convenient location for its use. Where utilized for steering a vessel, the operating wheel 229 thus replaces the conventional steering wheel, the compressor being located in any suitable place to be operated either by a short or a long shaft.

The construction and operation of the motor or actuator unit designated 13 is substantially as follows, having reference to Figs. 1 and 3. In this construction there is a fixed mounting 250 which supports two segmental cylinders 251 having the common central head 252, these cylinders each being open at the end 253 remote from the head. Each cylinder is formed on a radius from the center 254 and each is also preferably circular at any radial section as indicated at 255. There are ports 256 and 257 to which the pipes 19 and 20 respectively, are connected, these being located closely contiguous to the center head 252.

The arcuate piston assembly 260 has two curved piston arms or rods 261 extending from a central spoke 262. This spoke has a central hub 263 illustrated as a split type to engage a shaft 264 which in this instance is shown as square ended. As applied to a vessel, this shaft may be a rudder post or the shaft or other device which turns a rudder. The piston rods each have a piston 265 mounted on their inner ends and expansible piston cups 266 back against the pistons or piston heads. As the radius of curvature of the piston rods 261 is the same as that of the cylinders, manifestly the pistons and piston rods may enter either of the arcuate cylinders, hence in the operation of the equipment when the hydraulic pressure is changed in either of the cylinders by forcing fluid in one cylinder such as through a high pressure pipe 20, this exerts a pressure on the left hand piston of Fig. 1 causing a rotation of the piston rod and hub in the direction of the arrow, that is, counterclockwise as shown. The opposite piston therefore forces the fluid in the actuator out of the other arcuate cylinder into the pipe 20. By this construction it will be noted that a large angle turn may be made due to the movement of the pistons and their arcuate piston rods and the shaft 264. In the illustration this is sufficient to move the rudder of an ordinary vessel through the desired necessary sweep. Of course it is manifest that the shaft 264 may also be used as a driven shaft to operate a rudder through a gear or other similar connection. This type of circular cylinders thus gives a direct rotational action to a shaft or the like through the operation of the liquid transferred under pressure by the compressor and it will be apparent that due to the action of the positive lock valve the actuator may be turned to and left in any desired position and will remain in such position so long as the compressor is not operated and moreover there can be no back transfer of liquid from the motor or actuator to the compressor, hence no back slap is developed on the operating or steering wheel of the compressor.

In the construction of the valve operating device of Fig. 12 I show a portion of the housing assembly such as shown in Fig. 5 utilizing similar numerals to identify equivalent parts. In this construction it is desired to control the opening of the valve plug 55, this being accomplished by the expansible tube assembly designated 300. The housing has a suitable chamber 301 preferably cylindrical on its edge. The chamber may be quite narrow and have flat faces at the ends. The expansible tube 302 has a fixed end coupling 303 which is attached in such a manner as to form a communication with the ducts 43 and 42'. The free end of the tube is provided with an offset pin 304 which engages directly the upper end of an elongated valve stem 56, this passing through a guide bore 32, this being sufficiently large to allow free movement of the stem 56 and permit the chamber 301 being filled with liquid. Both of the main plug valve assemblies are constructed in a similar manner, that is, both use the expansible tube such as 302 and these being interconnected by passages and ducts such as shown in Fig. 5 and in the diagrams of Figs. 11 and 14.

The teeter valve operating construction is illustrated in connection with Fig. 13. This presents the expansible tube actuator assembly 310 in which the block housing the valve equipment has a chamber 311 cylindrical on its inside face 312 preferably having a plane surface on one side, the opposite side being formed by the inner face of the plug 313, this plug being removable allows inserting an assembly of the expansible tube. Such tube 314 is constructed in a manner similar to that shown in Fig. 12 and at one end has an attaching tubular connection 315, this forming a suitable connection to the ducts and pipes leading thereto. The free end of the curved tube has a projecting pin 316 positioned to engage an end of a teeter pin such as 72.

Utilizing these constructions, one of the teeter pin check valve actuated assemblies is identified as having the expansible operated tubes 374 and 375, these being hydraulically connected in the same manner as the diaphragm actuated devices 74 and 75' of Fig. 11. The actuation by differential pressures is obtained by installing and calibrating the tubes to expand the given amount for different pressures, thus the tube assembly 374 may be considered as the one having the weak valve actuator W and 375 the strong actuator marked S such as noted in Fig. 11, therefore in the assembly there is a connection by the ducts 76 between a weak tube assembly such as 374 and a stronger tube assembly equivalent to 74' of Fig. 11. Likewise the duct connection 77 links a strong expansible tube such as 375' with a weak tube equivalent to 75 of Fig. 11. The ducts 76 and 78 are connected and also the ducts 77 and 79. The other hydraulic connections are as shown in Fig. 11. Therefore the actuation of the teeter pin controlled check valves is similar to that described in connection with Fig. 11. Also the operation of the two plug valves each having an expansible tube assembly such as 300 is in the same manner as the diaphragm controls indicated 60 and 60' of Fig. 11. By this system using the expansible tubes or their equivalent, it is not necessary to provide air spaces or chambers nor air breathers nor is it necessary to have gaskets or packings to restrict the flow of the liquid as the expansible tubes may be immersed in liquid and even if the pressure changes it does not modify the expansion and contractive action of the curved tubes.

In the construction of Fig. 15 I show a typical metal diaphragm assembly designated 380 in which an annularly corrugated metal disk 381 is gripped between gaskets 382, these being confined against a shoulder 383 and a cap plug 384. This illustration shows a connection such as might be used to operate one of the plug valves but this can also be utilized in connection with the teeter pin actuated check valves. A base plug 385 restrains the expansive movement of the diaphragm, an air chamber 386 is provided below this bottom plug, there being an air breather duct 387. This construction may be considered as a modification of the diaphragm type of actuator valve.

Various changes may be made in the details of the construction without departing from the spirit or scope of the invention as defined by the appended claims.

I claim:

1. In a hydraulic pulsator system, means forming two hydraulic sides with liquid flow connections combined with a supply and drainage means for liquid to both sides of the system, each having a normally closed valve therein, pressure actuated means for each valve, one actuated by a relatively weak and the other by a relatively strong hydraulic reaction, hydraulic flow connections between both sides of the system to the pressure actuated means of said valves whereby both the relatively high pressure and relatively low pressure of the pulsator system operate the valve having a connection only to the low pressure side of the pulsator system for a flow of liquid to or from such low pressure side of the pulsator system, the two sides of the pulsator system each having a positive lock valve therein, the valve on the high pressure side being operative to open for flow of liquid therein, a hydraulic operative device for each of the lock valves with liquid pressure connections between both sides of the system, each hydraulic operative device having means to open its associated lock valve, the high pressure connection from the high pressure side operating the pressure device on the lock valve of the low pressure side to positively open such valve for reverse flow of liquid in the low pressure side.

2. In a hydraulic pulsator system having a compressor and a motor or actuator connected by two hydraulic flow sides whereby on operation of the compressor one side becomes relatively high pressure to the other sides becoming relatively low pressure, the combination of each side of the system having a normally closed check valve with hydraulic flow connections between such side of the system and the check valve and between the check valve and a discharge for surplus liquid and supply for replacement liquid, each check valve having two hydraulic devices requiring the operation of both to open the check valve, one of the devices of each pair operating on a relatively high and the other on a relatively low pressure, hydraulic connections from both sides of the pulsator system to the said hydraulic devices whereby the high pressure from the high pressure side of the pulsator system and the pressure from the low pressure side becomes operative to open the check valve on the low pressure side of the pulsator system only for flow of liquid through the check valve of the low pressure side of the pulsator system.

3. In a hydraulic pulsator system having a compressor and a motor or actuator connected by two hydraulic flow sides whereby on operation of the compressor one side becomes relatively high pressure to the other sides becoming relatively low pressure, the combination of a locked valve in each side, each valve including a hydraulic actuated movable device to open its valve, cross pressure connections from one hydraulic side to the device of the opposite side, each lock valve being constructed and adapted whereby the high pressure in the high pressure side opens its locked valve for flow of liquid between the compressor and motor or actuator and by the hydraulic pressure of the high pressure side operates the hydraulic device of the other lock valve to open such latter valve permitting a return flow of liquid on the low pressure side from the motor or actuator to the compressor, each side of the system having a normally closed check valve with hydraulic flow connections between such side of the system and the check valve and between the check valve and a discharge for surplus liquid and supply for replacement liquid, each check valve having two hydraulic devices requiring the operation of both to open the check valve, one of the devices of each pair operating on a relatively high and the other on a relatively low pressure, hydraulic connections from both sides of the pulsator system to the said hydraulic devices whereby the high pressure from the high pressure side of the pulsator system and the pressure from the low pressure side becomes operative to open the check valve on the low pressure side of the pulsator system only for flow of liquid through the check valve of the low pressure side of the pulsator system.

4. In a hydraulic pulsator system having a compressor and a motor or actuator connected by two hydraulic flow sides whereby on operation of the compressor one side becomes relatively high pressure to the other side becoming relatively low pressure, the combination of each side of the system having a normally closed check valve with a check valve plunger with hydraulic flow connections between such side of the system and the check valve and between the check valve and a discharge for surplus liquid and supply for replacement liquid, a teeter pin operating on the plunger, two hydraulic devices positioned to operate on each teeter pin, one of the devices of each pair operating on a relatively high and the other on a relatively low pressure, hydraulic connections from one side of the pulsator system to a high and low pressure hydraulic device, one on each side and vice versa whereby the high pressure from the high pressure side of the pulsator system and the pressure from the low pressure side becomes operative to open a check valve on the low pressure side of the pulsator system only for flow of liquid through the check valve of the low pressure side of the pulsator system.

5. In a hydraulic pulsator system, means forming two hydraulic sides with liquid flow connections combined with a supply and drainage means for liquid to both sides of the system, each having a normally closed valve therein, pressure actuated means for each valve, one actuated by a relatively weak and the other by a relatively strong hydraulic reaction, hydraulic flow connections between both sides of the system to the pressure actuated means of said valves whereby both the relatively high pressure and relatively low pressure of the pulsator system operate the valve having a connection only to the low pressure side of the pulsator system for a flow of liquid to or from such low pressure side of the pulsator system, the two hydraulic sides being for a relatively high pressure system, a second relatively low pressure pulsator system having a compressor and a motor with two hydraulic sides connected thereto and flow connections from each of said latter sides to the said supply and drainage means for the liquid to both sides of the first system.

6. In a hydraulic pulsator system having a compressor and a motor connected by two sides of hydraulic connections in which by operation of the compressor one side becomes relatively high pressure to the other side being a relatively low pressure, the combination of control valves on each side with operative connections for the control valve on the high pressure side to open, cross hydraulic connection from both sides to the control valve on the opposite side operative by the high pressure opening the valve on the low pressure side for a return flow from the motor to the compressor, a reservoir for replenishing liquid and to receive surplus liquid with a reservoir valve connection to each side, the reservoir valve being constructed to open on excess pressure in the reservoir over that in the pulsator system to replenish liquid in said system, a pressure means for operating each of the reservoir valves but operative only during a continuance of the relatively high and low pressures of the high and low pressure sides to open a connection to the low pressure side only for discharge of surplus liquid from the low pressure side.

7. In a hydraulic pulsator system having two hydraulic sides with connections and means to establish pressures relatively high on one side and relatively low on the other side, the combination of a source of replenishing fluid and supply connections operative on depletion of liquid and lowering of pressure in the system to replenish fluid and a discharge means for surplus fluid for each side that may be developed therein from temperature expansion, control valves for each side and a pressure responsive means operative only by pressures from the high and low pressure sides of the hydraulic system to open the valve connecting to the low pressure side for the discharge of the surplus fluid from the low pressure side.

8. In a hydraulic pulsator system having a compressor and a motor connected by two sides of hydraulic flow connections and in which by operation of the compressor either side may be relatively high pressure and the other, relatively low pressure, the combination of reservoirs for liquid, valved connections between a reservoir and a side of the hydraulic system for flow from the reservoir and the system and a pressure actuated means for each valved connection operative by the joint action of the pressure on the high and low pressure sides for discharge of surplus fluid that may be developed by temperature expansion from the low pressure side only to the reservoir.

9. In a hydraulic high pressure pulsator system, a compressor and a motor connected by two sides of a hydraulic system, two reservoirs each having a control valve and each valve having a relatively high and a relatively low hydraulic pressure device both requiring operation to open its valve, a hydraulic flow connection from each valve to each side of the hydraulic system, hydraulic connections from each side of the hydraulic system including connections to the relatively high pressure device of one control valve and relatively low pressure device of the other control valve whereby when the compressor is operated to produce a high pressure on one side of the system compared with a low pressure on the other side of the system, the control valve having the hydraulic flow connection to the low pressure side of the system becomes opened for flow of liquid from the low pressure side to the reservoir.

10. In a hydraulic high pressure pulsator system, a compressor and a motor connected by two sides of a hydraulic system, two reservoirs each having a control valve and each valve having a relatively high and a relatively low hydraulic pressure device both requiring operation to open its valve, a hydraulic flow connection from each valve to each side of the hydraulic system, hydraulic connections from each side of the hydraulic system including connections to the relatively high pressure device of one control valve and relatively low pressure device of the other control valve whereby when the compressor is operated to produce a high pressure on one side of the system compared with a low pressure on the other side of the system, the control valve having the hydraulic flow connection to the low pressure side of the system becomes opened for flow of liquid from the low pressure side to the reservoir, a second low pressure pulsator system having a compressor and motor connected by two hydraulic sides and a hydraulic flow connection from one reservoir to one side and from the other reservoir to the other side of the second pulsator system.

11. In a hydraulic pulsator system having in combination a first high pressure system with a compressor and a motor and connections therebetween, a reservoir system including a reservoir for replenishing liquid to the system and having means for discharge of surplus liquid from the system, a hydraulic control for the reservoir system actuated by the high and the low pressure sides of said compressor motor connection to supply liquid to the low pressure side only or to discharge liquid from the low pressure side only, a second relatively low pressure hydraulic pulsator system having a compressor and a motor and direct hydraulic connections from the reservoir to the low pressure pulsator system.

12. In a hydraulic pulsator system having a compressor and motor with two hydraulic mains producing a high and low pressure side, a locking valve in each main with cross pressure connections, pressure means for operating said valves on operation of the compressor to return hydraulic flow from the motor, an exhaust means, hydraulic lines between the two hydraulic mains and the exhaust means having a check valve in said latter lines, a pressure means for opening said check valve having connections to the low and high pressure sides of the hydraulic mains requiring a joint high and low pressure action to open the check valve on the low pressure side only and allow flow from the low pressure side to the reservoir on expansion of liquid.

13. In a hydraulic pulsator system having a compressor, a motor, two hydraulic mains between the compressor and the motor developing a high and low pressure side, each main having a check valve opening only for flow by pressure from the compressor and forming a locked valve system, exhaust lines from the motor side of each of the said check valves, each exhaust line having a relief valve, and pressure operated means connected to the motor side of the said check valves whereby expansion of liquid on the motor side causes an opening of the relief valve by the combined high and low pressure side of the hydraulic mains.

14. In a hydraulic pulsator system having a compressor and a motor, a set of hydraulic connections connecting each side of the compressor to its corresponding side of the motor, control valves in each set of hydraulic connections adapted to be opened by the pressure generated therein by the compressor, a liquid reservoir, means for maintaining liquid therein under pressure, and means operable by the combined pressures in both sets of hydraulic connections for opening the reservoir to one of said sets of hydraulic connections.

15. In a hydraulic pulsator system having a compressor and a motor, a set of hydraulic connections connecting each side of the compressor to its corresponding side of the motor, control valves in each set of hydraulic connections adapted to be opened by the pressure generated therein by the compressor, a liquid reservoir, means for maintaining liquid therein under pressure, and means operable by the combined pressures in both sets of hydraulic connections for opening the reservoir to that set of hydraulic connections having the least pressure therein.

16. In a hydraulic pulsator system having a compressor and a motor, a set of hydraulic connections connecting each side of the compressor to corresponding sides of the motor, control valves in each set of hydraulic connections adapted to be opened by the pressure generated therein by the compressor, a liquid reservoir for each set of hydraulic connections, a valve controlling communication between each reservoir and its set of hydraulic connections, and means influenced by the combined pressures in both sets of hydraulic connections for opening said valve.

17. In a hydraulic pulsator system, having a compressor, a motor, sets of hydraulic connections connecting each side of the compressor to corresponding sides of the motor, a reservoir for each set of hydraulic connections, a valve for each reservoir controlling ingress from its set of hydraulic connections to the reservoir, and means operable by the pressures in both sets of hydraulic connections for opening that valve which will permit ingress to the reservoir from that set of hydraulic connections having the least pressure therein when said least pressure exceeds a predetermined degree.

18. In a hydraulic pulsator system having a compressor, a motor, sets of hydraulic connections connecting each side of the compressor to corresponding sides of the motor, a reservoir for each set of hydraulic connections, means for maintaining the fluid in the reservoir under pressure, check valve means permitting flow from each reservoir to its set of hydraulic connections whenever pressure in the reservoir exceeds pressure in its set of hydraulic connections but preventing flow in the opposite direction, and means operable by the combined pressures in both sets of hydraulic connections for opening that check valve means which will permit flow from the set of hydraulic connections having the least pressure in its reservoir when the pressure in the mentioned set of hydraulic connections exceeds a predetermined degree.

19. In a hydraulic pulsator system, having a compressor, a motor, sets of hydraulic connections connecting each side of the compressor to corresponding sides of the motor, a reservoir for each set of hydraulic connections, means for maintaining the fluid in the reservoir under pressure, check valve means permitting flow from each reservoir to its set of hydraulic connections whenever pressure in the reservoir exceeds pressure in its set of hydraulic connections but preventing flow in the opposite direction, and means operable by the combined pressures in both sets of hydraulic connections for opening that check valve means which will permit flow from the set of hydraulic connections having the least pressure in its reservoir when the pressure in the mentioned set of hydraulic connections exceeds a predetermined degree, comprising a teeter pin for each check valve means, pressure operated devices operatively connected to the ends of each teeter pin, one pressure operated device of each teeter pin being resisted by a relatively strong spring and the other pressure operated device of each teeter pin being resisted by a relatively weak spring, the strongly resisted pressure operated devices of each teeter pin together with the weakly resisted pressure operated device of the other teeter pin being connected to the same set of hydraulic connections.

20. In a hydraulic pulsator system having two sets of hydraulic connections, one of which is adapted to have a high pressure imposed therein while the other remains at relatively low pressure, a supply reservoir for each set of hydraulic connections, a check valve permitting flow from each reservoir to each set of connections when pressure in the reservoir exceeds that in its set of hydraulic connections, and means subject to pressures in both set of connections operable upon each check valve to open the check valve of the set of connections having the least pressure when high pressure is imposed in the other set of connections and the pressure in the low pressure set of connections exceeds a predetermined degree.

CHARLES U. BALLARD.